US012614762B2

(12) United States Patent
Qiu et al.

(10) Patent No.: US 12,614,762 B2
(45) Date of Patent: *Apr. 28, 2026

(54) BATTERY

(71) Applicant: ZHUHAI COSMX BATTERY CO., LTD., Zhuhai (CN)

(72) Inventors: Yaming Qiu, Zhuhai (CN); Hai Wang, Zhuhai (CN); Suli Li, Zhuhai (CN); Junyi Li, Zhuhai (CN)

(73) Assignee: ZHUHAI COSMX BATTERY CO., LTD., Zhuhai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/004,117

(22) Filed: Dec. 27, 2024

(65) Prior Publication Data

US 2025/0140937 A1 May 1, 2025

Related U.S. Application Data

(63) Continuation of application No. 18/945,844, filed on Nov. 13, 2024, which is a continuation-in-part of (Continued)

(30) Foreign Application Priority Data

Dec. 14, 2022 (CN) ........................ 202211609400.3

(51) Int. Cl.

*H01M 10/0587* (2010.01)
*H01M 10/0525* (2010.01)

(Continued)

(52) U.S. Cl.

CPC ... *H01M 10/0587* (2013.01); *H01M 10/0525* (2013.01); *H01M 10/0567* (2013.01);

(Continued)

(58) Field of Classification Search

CPC ......... H01M 10/0587; H01M 10/0525; H01M 10/0567; H01M 10/0568; H01M 10/0569;

(Continued)

(56) References Cited

U.S. PATENT DOCUMENTS

| | | | | |
|---|---|---|---|---|
| 2006/0222940 | A1* | 10/2006 | Fujikawa | H01M 10/0587 429/174 |
| 2009/0092900 | A1* | 4/2009 | Obana | H01M 50/446 429/246 |
| 2019/0356014 | A1 | 11/2019 | Abe et al. | |

FOREIGN PATENT DOCUMENTS

| | | |
|---|---|---|
| CN | 101003630 A | 7/2007 |
| CN | 109244530 A | 1/2019 |

(Continued)

OTHER PUBLICATIONS

International Search Report issued in corresponding PCT Application No. PCT/CN2023/125220, dated Jan. 11, 2024.

(Continued)

*Primary Examiner* — Osei K Amponsah

(74) *Attorney, Agent, or Firm* — K&L Gates LLP

(57) ABSTRACT

A battery includes: a housing having a cavity; a battery cell arranged in the cavity, the battery cell including a positive electrode plate, a negative electrode plate, and a separator; and an electrolyte solution filled in the battery cell including fluoroethylene carbonate. A width of the separator is greater than that of the positive and the negative electrode plate. The battery satisfies following relationship: C≥B/20A+1, where a content of fluoroethylene carbonate in the electrolyte solution is C %, A represents a distance between an edge of the separator and that of an electrode plate on the same side, and B represents a height of the cavity. When the foregoing relationship is satisfied, deterioration of performance of the battery cell caused by insufficient electrolyte solution may (Continued)

be alleviated, thereby improving a value of a self-discharge coefficient k and cycling performance of the battery.

15 Claims, 2 Drawing Sheets

Related U.S. Application Data application No. PCT/CN2023/125220, filed on Oct. 18, 2023.

(51) Int. Cl.

| | |
|---|---|
| ***H01M 10/0567*** | (2010.01) |
| ***H01M 10/0568*** | (2010.01) |
| ***H01M 10/0569*** | (2010.01) |
| ***H01M 10/0585*** | (2010.01) |
| ***H01M 10/42*** | (2006.01) |
| ***H01M 50/46*** | (2021.01) |

(52) U.S. Cl.

CPC ... *H01M 10/0568* (2013.01); *H01M 10/0569* (2013.01); *H01M 10/0585* (2013.01); *H01M 10/4235* (2013.01); *H01M 50/46* (2021.01); *H01M 2300/0042* (2013.01)

(58) Field of Classification Search

CPC ......... H01M 10/0585; H01M 10/4235; H01M 50/46; H01M 2300/0042

See application file for complete search history.

(56) References Cited

FOREIGN PATENT DOCUMENTS

| | | | | | |
|---|---|---|---|---|---|
| CN | 109301312 | A | | 2/2019 | |
| CN | 112271271 | A | | 1/2021 | |
| CN | 115101815 | A | | 9/2022 | |
| CN | 116231105 | A | | 6/2023 | |
| JP | 2013-201094 | A | * | 10/2013 | ........ H01M 10/0587 |
| WO | 2021135921 | A1 | | 7/2021 | |

OTHER PUBLICATIONS

The First Office Action received in the counterpart CN Application No. 202211609400.3, dated Nov. 25, 2025, 14 pages with English translation.

Standardization Administration of China and General Administration of Quality Supervision, Inspection and Quarantine of China, "National Standard of the People's Republic of China GB/T34013-2017 Dimensions of Traction Battery for Electric Vehicles", published on Jul. 12, 2017, pp. 1-6.

* cited by examiner

BATTERY

CROSS-REFERENCE TO RELATED APPLICATIONS

This application is a continuation of U.S. patent application Ser. No. 18/945,844, filed on Nov. 13, 2024, which is a continuation-in-part of International Application No. PCT/CN2023/125220, filed on Oct. 18, 2023. The International Application claims priority to Chinese Patent Application No. 202211609400.3, filed on Dec. 14, 2022. All of the afore-mentioned patent applications are hereby incorporated by reference in their entireties.

TECHNICAL FIELD

The present disclosure pertains to the battery field, and specifically relates to a battery.

BACKGROUND

Compared with conventional batteries, lithium-ion batteries have a series of advantages such as long cycle life and high energy density, and therefore the lithium-ion batteries are gradually widely used in various electronic products, such as mobile phones, computers, electric vehicles, and electric tools. For the lithium-ion batteries used in mobile phones and computers, with the advancement of science and technology, the batteries need to have stronger energy, to adapt to higher-power electronic products and provide a longer service time.

A lithium-ion battery mainly includes a positive electrode plate, a negative electrode plate, a separator, and an electrolyte solution. To make full use of capacities of the positive electrode and the negative electrode and prevent a short circuit, the separator is generally wider than the positive electrode plate and negative electrode plate, and the extra width on each side of the positive electrode plate or negative electrode plate is called a redundant width of the separator. To improve energy of the battery, a size of the battery needs to be increased, and energy density of the battery needs to be improved. Therefore, a width of a battery cell is increasing, and the redundant width of the separator needs to be minimized. Because of the increased width of the battery cell and the minimized redundant width of the separator, the electrolyte solution of the battery is increasingly insufficient, which affects performance of the battery.

SUMMARY

An objective of embodiments of the present disclosure is to provide a battery, to solve a problem that insufficient electrolyte solution of a battery affects performance of the battery.

The present disclosure provides a battery, including:

a housing, where the housing has a cavity;

a battery cell, where the battery cell is arranged in the cavity, the battery cell includes a positive electrode plate, a negative electrode plate, and a separator arranged between the positive electrode plate and the negative electrode plate, and the positive electrode plate, the negative electrode plate, and the separator are wound to form the battery cell;

where in a winding axis direction of the battery cell, a width of the separator is greater a width of the positive electrode plate and a width of the negative electrode plate, and a height of the cavity is greater than or equal to the width of the separator; and an electrolyte solution, where the electrolyte solution is filled in the battery cell, and the electrolyte solution includes fluoroethylene carbonate, where the cavity, the separator, and the electrolyte solution satisfy following relationship:

$$C \geq B/20A + 1,$$

where a content of fluoroethylene carbonate in the electrolyte solution is C %, and a value of C is less than or equal to 20 and greater than or equal to 2.25;

A represents a distance between an edge of the separator and an edge of a positive electrode plate that are on a same side in the winding axis direction of the battery cell, and B represents a height of the cavity in the winding axis direction of the battery cell, and B ranges from 50 mm to 400 mm.

In a battery of the present disclosure, components of the electrolyte solution are appropriately adjusted based on the distance A between an edge of the separator and an edge of the positive electrode plate that are on the same side in the winding axis direction of the battery cell and the height B of the cavity in the winding axis direction of the battery cell, so that the content of fluoroethylene carbonate in the electrolyte solution satisfies the foregoing relationship. Ensuring the foregoing relationship and controlling the range of B and C can alleviate deterioration of the performance of the battery cell caused by insufficient electrolyte solution, thereby improving a value of a self-discharge coefficient k of the battery and cycling performance of the battery.

DETAILED DESCRIPTION OF THE EMBODIMENTS

Figure 1:
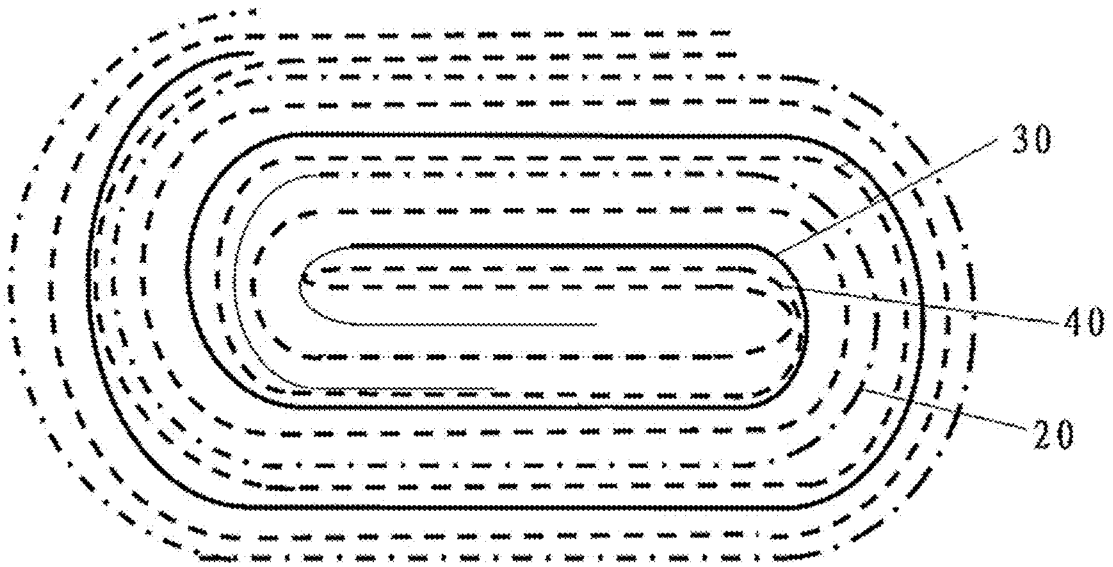
FIG. 1 is a schematic diagram of a structure of a jelly roll.

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on embodiments of the present disclosure without creative efforts shall fall within the protection scope of the present disclosure.

The terms "first", "second", and the like in the specification and claims of the present disclosure used to distinguish between similar objects instead of describing a specific order or sequence. It should be understood that data used in such a way is interchangeable in a proper circumstance, so that the embodiments of the present disclosure can be implemented in other orders than the order illustrated or described herein. In addition, "and/or" in the specification and claims represents at least one of connected objects, and the character "/" generally indicates that the associated objects have an "or" relationship.

In the present disclosure, halogens refer to F, Cl, Br, and I. In other words, F, Cl, Br, and I can be described as halogens in this specification. The $C_{1-10}$ alkyl should be understood as preferably representing linear or branched saturated monovalent alkyl with 1 to 10 carbon atoms. Specifically, the $C_{1-10}$ alkyl should be understood as preferably representing linear or branched saturated monovalent alkyl with 1, 2, 3, 4, 5, 6, 7, 8, 9, or 10 carbon atoms. For example, the alkyl is methyl, ethyl, propyl, butyl, amyl, hexyl, isopropyl, isobutyl, sec-butyl, tert-butyl, isoamyl, 2-methylbutyl, 1-methylbutyl, 1-ethylpropyl, 1,2-dimethylpropyl, neopentyl, 1,1-dimethylpropyl, 4-methylpentyl, 3-methylamyl, 2-methylpentyl, 1-methylpentyl, 2-ethylbutyl, 1-ethylbutyl, 3,3-dimethylbutyl, 2,2-dimethylbutyl, 1,1-dimethylbutyl, 2,3-dimethylbutyl, 1,3-dimethylbutyl, 1,2-dimethylbutyl, or the like, or an isomer thereof. In particular, a "$C_{1-6}$ alkyl" group may have 1, 2, 3, 4, 5, or 6 carbon atoms, for example, methyl, ethyl, propyl, butyl, isopropyl, isobutyl, sec-butyl, or tert-butyl. More particularly, a "$C_{1-3}$ alkyl" group may have 1, 2, or 3 carbon atoms, for example, methyl, ethyl, n-propyl, or isopropyl.

An embodiment of the present disclosure provides a battery, including:

a housing, where the housing has a cavity;

a battery cell, where the battery cell is arranged in the cavity, the battery cell includes a positive electrode plate, a negative electrode plate, and a separator arranged between the positive electrode plate and the negative electrode plate, and the positive electrode plate, the negative electrode plate, and the separator are wound to form the battery cell;

where in a winding axis direction of the battery cell, a width of the separator is greater than a width of the positive electrode plate and a width of the negative electrode plate, and a height of the cavity is greater than or equal to the width of the separator; and an electrolyte solution, where the electrolyte solution is filled in the battery cell, and the electrolyte solution includes fluoroethylene carbonate, where the cavity, the separator, and the electrolyte solution satisfy following relationship:

$$C \geq B/20A + 1,$$

where a content of fluoroethylene carbonate in the electrolyte solution is C %, A represents a distance between an edge of the separator and an edge of an electrode plate that are on a same side in the winding axis direction of the battery cell (It can also be called a redundant width of the separator), and B represents a height of the cavity in the winding axis direction of the battery cell. In some embodiments, A represents a distance between an edge of the separator and an edge of a positive electrode plate that are on a same side in the winding axis direction of the battery cell. In the case where the redundant width of the separator varies across the same battery cell, if there is an indication, the value should be taken as specified; otherwise, its minimum value can be used as the redundant width A of the separator.

In the equation C≥B/(20A+1), the calculation of B/(20A+1) is carried out according to the following rules: firstly, divide B by 20A to obtain the quotient, and then add 1 to the quotient and compare it with C. In this case, when 20A is taken as a whole, that is, when A multiplied by 20 (twenty times A) serves as the divisor, B serves as the dividend, with the quotient obtained by dividing B by 20A corresponding to the quotient obtained by dividing B directly by 20A.

In an embodiment, a ratio of the height B of the cavity in the winding axis direction of the battery cell to the distance A between the edge of the separator and the edge of the electrode plate that are on the same side in the winding axis direction of the battery cell ranges from 25 to 200, for example, 25, 50, 75, 100, 125, 150, 175, and 200.

In an embodiment, a value of C is less than or equal to 20, for example, 2, 4, 6, 8, 10, 12, 14, 16, 18, and 20.

In an embodiment, the value of C is greater than or equal to 2.25.

In an embodiment, the distance A between an edge of the separator and an edge of the electrode plate that are on the same side in the winding axis direction of the battery cell ranges from 0.5 mm to 4 mm, such as 0.5 mm, 1 mm, 1.5 mm, 2 mm, 2.5 mm, 3 mm, 3.5 mm, or 4 mm; and/or, the height B of the cavity in the winding axis direction of the battery cell ranges from 50 mm to 400 mm, such as 50 mm, 100 mm, 150 mm, 200 mm, 250 mm, 300 mm, 350 mm, or 400 mm.

In an embodiment, the electrolyte solution further includes: at least one of an electrolyte salt or a solvent.

In an embodiment, the electrolyte salt includes at least one of lithium hexafluorophosphate, lithium difluorophosphate, lithium difluoro (oxalato) borate, lithium bis (fluorosulfonyl) imide, lithium bis (trifluoromethanesulphonyl) imide, lithium difluorobis (oxalato) phosphate, lithium tetrafluoroborate, lithium bis (oxalate) borate, lithium hexafluoroantimonate, lithium hexafluoroarsenate, lithium bis (trifluoromethylsulfonyl) imide, lithium bis (pentafluoroethanylsulfonyl) imide, tris (trifluoromethylsulfonyl) methyllithium, or lithium bis (trifluoromethylsulfonyl) imide. And/or, the solvent is selected from at least one of carbonate and/or carboxylate, and the carbonate is selected from at least one of the following fluorinated or unsubstituted solvents: ethylene carbonate, propylene carbonate, dimethyl carbonate, diethyl carbonate, and ethyl methyl carbonate; and the carboxylate is selected from at least one of the following fluorinated or unsubstituted solvents: propyl acetate, n-butyl acetate, isobutyl acetate, n-amyl acetate, isoamyl acetate, propyl propionate, ethyl propionate, methyl butyrate, and ethyl n-butyrate.

In an embodiment, the electrolyte solution further includes: a first additive, where a structural formula of the first additive is:

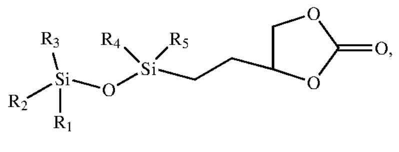

where $R_1$ to $R_5$ are independently selected from H, Ra, $C_{1-10}$ alkyl, or any $C_{1-10}$ alkyl substituted by at least one Ra, and each Ra is independently selected from at least one of halogen, $C_{1-10}$ alkyl, —C(=O)—$C_{1-10}$ alkyl, —C(=O)—O—C(=O)—$C_{1-10}$ alkyl, $C_{6-14}$ aryl, or 5- to 14-membered heteroaryl.

In an embodiment, a content of the first additive accounts for 0.1 wt % to 5 wt % of a mass of the electrolyte solution.

In an embodiment, the electrolyte solution further includes: a second additive, where the second additive includes at least one of fluoroethylene carbonate, 1,3-propane sultone, 1-propene 1,3-sultone, succinonitrile, adiponitrile, glycerol trinitrile, 1,3,6-hexanetricarbonitrile, lithium difluoro (oxalato) borate, lithium difluorophosphate, or lithium bisoxalatodifluorophosphate.

In an embodiment, a content of the second additive accounts for 0 wt % to 15 wt % of the mass of the electrolyte solution.

According to the battery in this embodiment of the present disclosure, the battery cell is arranged in the cavity, the battery cell includes a positive electrode plate, a negative electrode plate, and a separator arranged between the positive electrode plate and the negative electrode plate, and the positive electrode plate, the negative electrode plate, and the separator are wound to form the battery cell; in a winding axis direction of the battery cell, a width of the separator is greater a width of the positive electrode plate and a width of the negative electrode plate, and a height of the cavity is greater than or equal to the width of the separator; the electrolyte solution is filled in the battery cell, and the electrolyte solution includes fluoroethylene carbonate; and the cavity, the separator, and the electrolyte solution satisfy following relationship: C≥B/20A+1, where a content of fluoroethylene carbonate in the electrolyte solution is C %, A represents a distance between an edge of the separator and an edge of an electrode plate that are on the same side in the winding axis direction of the battery cell, and B represents a height of the cavity in the winding axis direction of the battery cell. Components of the electrolyte solution are appropriately adjusted based on the distance A between an edge of the separator and an edge of the electrode plate that are on the same side in the winding axis direction of the battery cell and the height B of the cavity in the winding axis direction of the battery cell, so that the content of fluoroethylene carbonate in the electrolyte solution satisfies the foregoing relationship. This alleviates deterioration of the performance of the battery cell caused by insufficient electrolyte solution, thereby improving a value of a self-discharge coefficient k of the battery and cycling performance of the battery.

Figure 2:
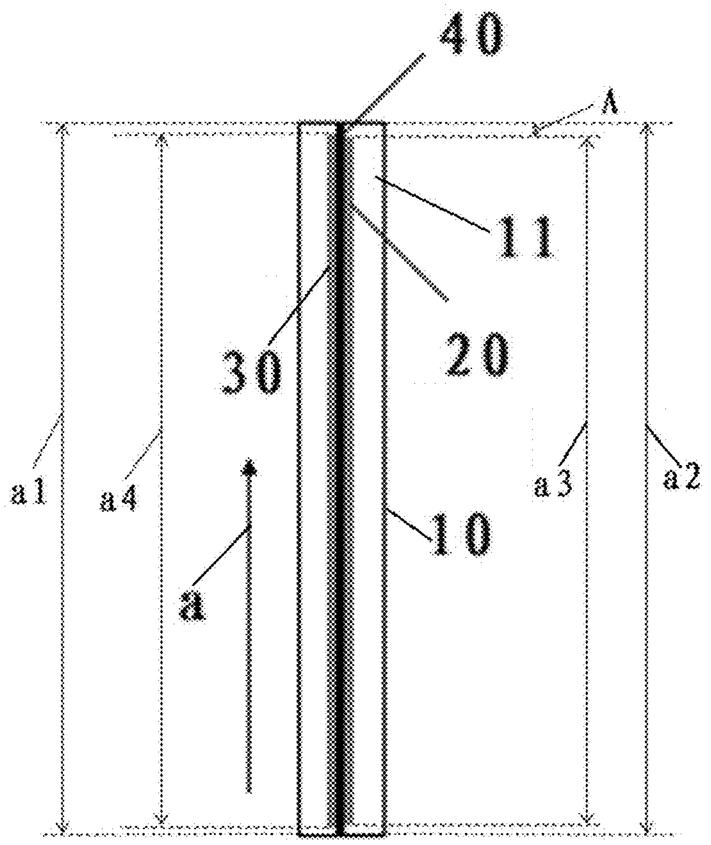
FIG. 2 shows a relationship between a width of a separator, a width of an electrode plate, and a height of a cavity in a winding axis direction of a battery cell.

The following describes in detail the battery provided in the embodiments of the present disclosure based on specific embodiments and application scenarios thereof with reference to FIG. 1 and FIG. 2.

The battery in the embodiments of the present disclosure includes: a housing 10, and a battery cell, and an electrolyte solution, where the housing 10 is provided with a cavity 11, and the battery cell is arranged in the cavity 11. The housing 10 may be columnar, cuboidal, or cube-shaped, and the cavity 11 may be columnar, cuboidal, or cube-shaped. For example, the housing 10 may be columnar, the cavity 11 may be columnar, and axes of the housing 10 and the cavity 11 may coincide or be parallel. In an embodiment, a cross-sectional view of the battery along the winding axis direction a and perpendicular to the separator is, for example, shown in FIG. 2. It should be noted that only one set of "positive plate 20 +separator 40 +negative plate 30" is illustrated in FIG. 2. However, it can be understood due to the battery being a wound-type battery as shown in FIG. 1, that the cross-section will present multiple overlapping sets of "positive plate 20+separator 40+negative plate 30". To make the image clearer and more concise, other sets have been omitted.

The battery cell includes a positive electrode plate 20, a negative electrode plate 30, and a separator 40 arranged between the positive electrode plate 20 and the negative electrode plate 30. The positive electrode plate 20, the negative electrode plate 30, and the separator 40 are wound to form the battery cell. The positive electrode plate 20, the negative electrode plate 30, and the separator 40 may be wound around a winding axis (that is, the geometric center point of the battery cell shown in FIG. 1 in the direction perpendicular to the paper). The winding axis can coincide or parallel to an axis of the battery cell, and the winding axis can coincide or parallel to an axis of the cavity 11.

As shown in FIG. 2, a may represent the winding axis direction; a width of the separator 40, a width of the positive electrode plate 20, and a width of the negative electrode plate 30 means the dimension thereof in the winding axis direction; a1 represents the width of the separator 40; the height a2 of the cavity 11 means a spacing between an upper inner side wall and a lower inner side wall of the cavity 11, which is also represented as 'B' in this disclosure; a3 represents the width of the positive electrode plate 20; and a4 represents the width of the negative electrode plate 30.

The width a1 of the separator 40 is greater than the width a3 of the positive electrode plate 20 and the width a4 of the negative electrode plate 30, and the height of the cavity 11 are greater than or equal to the width of the separator 40, so that the positive electrode plate 20 and the negative electrode plate 30 are isolated by the separator 40. The housing 10 may be columnar, the cavity 11 may be columnar, and axes of the housing 10 and the cavity 11 may coincide. An upper edge of the separator 40 may be abutted against the upper inner side wall of the cavity 11, and a lower edge of the separator 40 may be abutted against the lower inner side wall of the cavity 11. The width al of the separator 40 may be equal to the height a2 of the cavity 11 in the winding axis direction of the battery cell.

The electrolyte solution is filled in the battery cell. The electrolyte solution includes fluoroethylene carbonate (FEC), and the electrolyte solution may include an electrolyte, a solvent, an additive, and the like. The electrolyte solution may be selected based on an actual requirement. The cavity 11, the separator 40, and the electrolyte solution may satisfy following relationship: C≥B/20A+1, where a content of fluoroethylene carbonate in the electrolyte solution is C %, A represents a distance between an edge of the separator 40 and an edge of a positive electrode plate that are on the same side in the winding axis direction of the battery cell, and B represents a height of the cavity 11 in the winding axis direction of the battery cell.

As shown in FIG. 2, A may represent a distance between an upper edge of the separator 40 and an upper edge of a positive electrode plate 20 that are on the same side in the winding axis direction of the battery cell. Similarly, A may represent a distance between a lower edge of the separator 40 and a lower edge of the positive electrode plate 20 that are on the same side in the winding axis direction of the battery cell. For example, C may be 7; the height of the cavity 11 in the winding axis direction of the battery cell may be 100 mm; and a distance between an edge of the separator 40 and an edge of a positive electrode plate that are on the same side in the winding axis direction of the battery cell may be 4 mm. Fluoroethylene carbonate can improve performance of a formed SEI membrane, and form a tight structural layer without increasing impedance, so as to prevent further decomposition and improve low-temperature performance of the electrolyte solution.

The battery may be a lithium-ion battery. For example, the battery may be a lithium cobalt oxide battery, a ternary battery, or a lithium iron phosphate battery.

The positive electrode plate 20 may include a positive electrode current collector and a positive electrode active material layer coated on a surface of either side or surfaces of both sides of the positive electrode current collector, and the positive electrode active material layer may include a positive electrode active material, a conductive agent, and a binder.

The negative electrode plate 30 may include a negative electrode current collector and a negative electrode active material layer coated on a surface of either side or surfaces of both sides of the negative electrode current collector, and the negative electrode active material layer may include a negative electrode active material, a conductive agent, and a binder.

Mass percentages of components in the positive electrode active material layer may be as follows: 80 wt % to 99.8 wt % for the positive electrode active material, 0.1 wt % to 10 wt % for the conductive agent, and 0.1 wt % to 10 wt % for the binder. The mass percentages of the components in the positive electrode active material layer may be as follows: 90 wt % to 99.6 wt % for the positive electrode active material, 0.2 wt % to 5 wt % for the conductive agent, and 0.2 wt % to 5 wt % for the binder.

Mass percentages of components in the negative electrode active material layer may be as follows: 80 wt % to 99.8 wt % for the negative electrode active material, 0.1 wt % to 10 wt % for the conductive agent, and 0.1 wt % to 10 wt % for the binder. The mass percentages of the components in the negative electrode active material layer may be as follows: 90 wt % to 99.6 wt % for the negative electrode active material, 0.2 wt % to 5 wt % for the conductive agent, and 0.2 wt % to 5 wt % for the binder.

The conductive agent may be selected from at least one of conductive carbon black, acetylene black, Ketjen black, conductive graphite, conductive carbon fiber, carbon nanotubes, metal powder, or carbon fiber. For example, the conductive agent may be selected from carbon nanotubes or carbon fiber.

The binder may be selected from at least one of sodium carboxymethyl cellulose, styrene-butadiene latex, polytetrafluoroethylene, or polyethylene oxide. For example, the binder may be selected from sodium carboxymethyl cellulose or polyethylene oxide.

The positive electrode active material may be selected from one or more of lithium transition metal oxide, lithium iron phosphate, or lithium-rich manganese-based material. A chemical formula of the lithium transition metal oxide may be $Li_{(1+x)}Ni_yCo_zM_{(1-y-z)}O_2$, where—$0.1 \leq x \leq 1$ (for example, it may be −0.1, 0, 0.1, 0.2, 0.3, 0.4, 0.5, 0.6, 0.7, 0.8, 0.9, 1), $0 \leq y \leq 1$ (for example, it may be 0, 0.1, 0.2, 0.3, 0.4, 0.5, 0.6, 0.7, 0.8, 0.9, 1), $0 \leq z \leq 1$ (for example, it may be 0, 0.1, 0.2, 0.3, 0.4, 0.5, 0.6, 0.7, 0.8, 0.9, 1), and $0 \leq y+z \leq 1$ (for example, it may be 0, 0.1, 0.2, 0.3, 0.4, 0.5, 0.6, 0.7, 0.8, 0.9, 1). M may be one or more of Mg, Zn, Ga, Ba, Al, Fe, Cr, Sn, V, Mn, Sc, Ti, Nb, Mo, or Zr. For example, M may be Mg or Mo, or M may be Zn and Sn. M may be specifically selected based on an actual requirement. The negative electrode active material may include a carbon-based negative electrode material. The carbon-based negative electrode material may include at least one of artificial graphite, natural graphite, mesocarbon microbeads, hard carbon, or soft carbon. For example, the carbon-based negative electrode material may include hard carbon or soft carbon. The negative electrode active material may further include a silicon-based negative electrode material. The silicon-based negative electrode material may be selected from at least one of nanosilicon, silicon-oxygen negative electrode material (SiOx ($0<x<2$)), or silicon-carbon negative electrode material. In the negative electrode active material, a mass ratio of the carbon-based negative electrode material to the silicon-based negative electrode material ranges from 10:0 to 1:19. For example, the mass ratio may be 1:19, 1:18, 1:17, 1:16, 1:15, 1:14, 1:13, 1:12, 1:11, 1:10, 1:9, 2:8, 3:7, 4:6, 5:5, 6:4, 7:3, 8:2, 9:1, or 10:0. The mass ratio of the carbon-based negative electrode material to the silicon-based negative electrode material may be selected based on an actual requirement.

The electrolyte solution in the battery is mainly used for lithium-ion conduction between the positive electrode and the negative electrode, and side reactions may occur between the electrolyte solution and the positive and negative electrodes. As a volume and a width of the lithium-ion battery increase and a redundant width A of the separator 40 decreases, a risk of a micro-short circuit increases; and there is less residual electrolyte solution in the battery cell, which affects the performance of the battery. In the battery in the embodiments of the present disclosure, components of the electrolyte solution are appropriately adjusted based on the distance A between an edge of the separator 40 and an edge of the positive electrode plate that are on the same side in the winding axis direction of the battery cell and the height of the cavity 11 in the winding axis direction of the battery cell, so that the content of fluoroethylene carbonate in the electrolyte solution satisfies the foregoing relationship. This prevents a significant increase in side reactions due to insufficient electrolyte solution cycling in the late stage, and alleviates deterioration of the performance of the battery cell caused by insufficient electrolyte solution, thereby improving a value of a self-discharge coefficient k of the battery and cycling performance of the battery.

In some embodiments, a ratio of the height of the cavity 11 in the winding axis direction of the battery cell to the distance between the edge of the separator 40 and the edge of the positive electrode plate that are on the same side in the winding axis direction of the battery cell ranges from 25 to 200. For example, as shown in FIG. 2, the height of the cavity 11 in the winding axis direction of the battery cell may be a2 (that is, B), the distance A between an edge of the separator 40 and an edge of the positive electrode plate that are on the same side in the winding axis direction of the battery cell, and the ratio of a2 to A (that is, B/A) ranges from 25 to 200. For example, the ratio of the height of the cavity 11 in the winding axis direction of the battery cell to the distance between the edge of the separator 40 and the edge of the positive electrode plate that are on the same side in the winding axis direction of the battery cell is 25 or 100.

In some other embodiments, a value of C may be less than or equal to 20, that is, the content of fluoroethylene carbonate in the electrolyte solution is less than or equal to 20%; and the value of C may be greater than or equal to 2.25 (that is, the content of fluoroethylene carbonate in the electrolyte solution is greater than or equal to 2.25%). For example, the value of C may be 7 or 11, that is, the content of fluoroethylene carbonate in the electrolyte solution is 7% or 11%, so that the electrolyte solution includes sufficient content of fluoroethylene carbonate. This can prevent excessive content of fluoroethylene carbonate in the electrolyte solution, thereby reducing other components and alleviating adverse impact on performance of a battery.

In some embodiments, a distance A between an edge of the separator 40 and an edge of a positive electrode plate that are on the same side in the winding axis direction of the battery cell ranges from 0.5 mm to 4 mm. For example, the distance between the edge of the separator 40 and an edge of the positive electrode plate that are on the same side in the winding axis direction of the battery cell may be 4 mm.

Optionally, the height B of cavity 11 in the winding axis direction of the battery cell ranges from 50 mm to 400 mm. For example, the height of the cavity 11 in the winding axis direction of the battery cell is 200 mm. For example, the distance between an edge of the separator 40 and an edge of a positive electrode plate that are on the same side in the winding axis direction of the battery cell may be 4 mm, the height of the cavity 11 in the winding axis direction of the battery cell is 100 mm, and the value of C may be 7, so that the content of fluoroethylene carbonate in the electrolyte solution satisfies the foregoing relationship. This alleviates deterioration of the performance of the battery cell caused by insufficient electrolyte solution, thereby improving a value of a self-discharge coefficient k of the battery and cycling performance of the battery.

In some embodiments, the electrolyte solution further includes at least one of an electrolyte salt or a solvent. The electrolyte salt may be a lithium salt, and the solvent may be an organic solvent.

Optionally, the electrolyte salt may include at least one of lithium hexafluorophosphate ($LiPF_6$), lithium difluorophosphate ($LiPO_2F_2$), lithium difluoro(oxalato)borate (LiDFOB), lithium bis(fluorosulfonyl)imide (LiTFSI), lithium bis(trifluoromethanesulphonyl)imide, lithium difluorobis(oxalato)phosphate, lithium tetrafluoroborate, lithium bis(oxalate)borate, lithium hexafluoroantimonate, lithium hexafluoroarsenate, lithium bis(trifluoromethylsulfonyl)imide, lithium bis(pentafluoroethanylsulfonyl)imide, tris(trifluoromethylsulfonyl)methyllithium, or lithium bis(trifluoromethylsulfonyl)imide. For example, the electrolyte salt may be lithium hexafluorophosphate ($LiPF_6$). A specific type and a content of the electrolyte salt may be selected based on an actual requirement.

Optionally, the solvent may be selected from at least one of carbonate and/or carboxylate, and the carbonate is selected from at least one of the following fluorinated or unsubstituted solvents: ethylene carbonate (EC), propylene carbonate (PC), dimethyl carbonate, diethyl carbonate (DEC), and ethyl methyl carbonate. For example, the solvent may be selected from ethylene carbonate (EC), propylene carbonate (PC), or diethyl carbonate (DEC). Optically, the carboxylate may be selected from at least one of the following fluorinated or unsubstituted solvents: propyl acetate, n-butyl acetate, isobutyl acetate, n-amyl acetate, isoamyl acetate, propyl propionate (PP), ethyl propionate (EP), methyl butyrate, and ethyl n-butyrate. For example, the carboxylate may be selected from at least one of n-butyl acetate or ethyl n-butyrate. A specific type and a content of the solvent may be selected based on an actual requirement.

In an embodiment of the present disclosure, the electrolyte solution further includes: a first additive, where a structural formula of the first additive is:

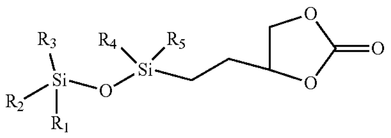

$R_1$ to $R_5$ may be the same or different, and $R_1$ to $R_5$ may be independently selected from H, Ra, $C_{1-10}$ alkyl, or any $C_{1-10}$ alkyl substituted by at least one Ra. Each Ra is the same or different, and each Ra may be independently selected from at least one of halogen, $C_{1-10}$ alkyl, —C(═O)—$C_{1-10}$ alkyl, —C(═O)—O—C(═O)—$C_{1-10}$ alkyl, $C_{6-14}$ aryl, or 5- to 14-membered heteroaryl. $R_1$ to $R_5$ may be independently selected from H or methyl. $R_1$ to $R_5$ may be all selected from H. $R_1$ to $R_5$ may be all selected from methyl. $R_1$ to $R_5$ may be selected according to an actual requirement. The additive can improve film forming on the negative electrode, and is conducive to removing the by-product HF, thereby improving cycling performance and safety performance of the battery. The substitution manner of Ra in $C_{1-10}$ alkyl groups, which is replaced by at least one Ra, can either be the substitution of H in the $C_{1-10}$ alkyl group or the substitution of the $C_{1-10}$ alkyl group itself. For example, if $R_1$ is a methyl group substituted by Ra, and Ra is a phenyl group, then $R_1$ can be tolyl or Ra, which is phenyl.

In an embodiment, $R_1$ to $R_5$ are independently selected from H, $C_{1-3}$ alkyl, —C(═O)—$C_{1-3}$ alkyl, or $C_{6-8}$ aryl.

In an embodiment, $R_1$ to $R_5$ are all selected from H, methylene, ethyl, —C(═O)—$C_2H_5$, or phenyl.

In an embodiment, at least two of $R_1$ to $R_5$ are independently selected from H or methyl. The phrase 'at least two' implies two, three, four, or five.

In an embodiment, $R_1$ to $R_5$ are all selected from methyl.

In some embodiments, the first additive contains at least one of the compounds as shown in the following chemical formulas:

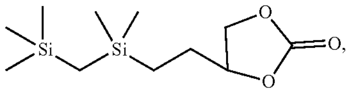
,

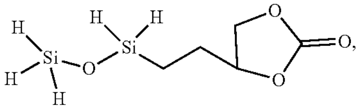
,

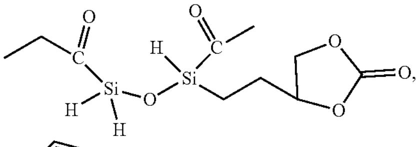
, or

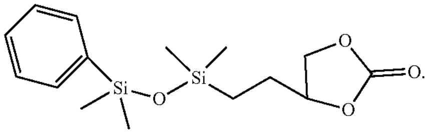
.

Optionally, the content of the first additive is 0.1 wt % to 5 wt % of the mass of the electrolyte solution. For example, the content of the first additive may be 0.1 wt %, 0.2 wt %, 0.5 wt %, 1 wt %, 2 wt %, 3 wt %, 4 wt %, or 5 wt % of the mass of the electrolyte solution, and the specific content of the first additive may be selected based on an actual requirement.

In some embodiments, the electrolyte solution further includes: a second additive, where the second additive may include at least one of fluoroethylene carbonate, 1,3-propane sultone, 1-propene 1,3-sultone, succinonitrile, adiponitrile, glycerol trinitrile, 1,3,6-hexanetricarbonitrile, lithium difluoro(oxalato)borate, lithium difluorophosphate, or lithium bisoxalatodifluorophosphate. For example, the second additive may include fluoroethylene carbonate and 1,3-propane sultone; and the second additive may include lithium difluoro(oxalato)borate and lithium difluorophosphate. A specific type and a content of the second additive may be selected based on an actual requirement. The second additive can protect the positive electrode and the negative electrode of the battery, and improve cycling and high-temperature performance, and the like.

Optionally, the content of the second additive accounts for 0 wt % to 15 wt % of the mass of the electrolyte solution. For example, the content of the second additive may be 0 wt % (0 wt % means no second additive is added.), 0.5 wt %, 1 wt %, 2 wt %, 3 wt %, 4 wt %, 5 wt %, 6 wt %, 7 wt %, 8 wt %, 9 wt %, 10 wt %, 12 wt %, or 15 wt % of the mass of the electrolyte solution. The specific content of the second additive may be selected based on an actual requirement.

The following further describes the present disclosure based on some specific embodiments.

Batteries in Examples and Comparative Examples were prepared through the following steps.

(1) Preparation of a Positive Electrode Plate

Positive electrode active materials lithium cobalt oxide ($LiCoO_2$), polyvinylidene fluoride (PVDF), SP (super P), and carbon nanotubes (CNT) were mixed at a mass ratio of 96:2:1.5:0.5, and were added with N-methylpyrrolidone (NMP). The mixture was stirred under action of a vacuum mixer until a mixed system became a uniform fluid positive electrode active slurry. Both surfaces of an aluminum foil were coated uniformly with the positive electrode active slurry. The coated aluminum foil was dried, then rolled, and cut, to obtain a required positive electrode plate.

(2) Preparation of a Negative Electrode Plate

Negative electrode active materials artificial graphite, sodium carboxymethyl cellulose (CMC-Na), styrene-butadiene rubber, conductive carbon black (SP), and single-walled carbon nanotubes (SWCNTs) were mixed at a mass ratio of 96:1.5:1.5:0.95:0.05, and were added with deionized water. The mixture was stirred under action of a vacuum mixer to obtain a negative electrode active slurry. Both sides of a copper foil were uniformly coated with the negative electrode active slurry. The coated copper foil was dried at room temperature, was then transferred to an oven for drying at 80° C. for 10 hours, then cold-pressing parameters were adjusted, and then cutting was performed, to obtain the negative electrode plate.

(3) Preparation of an Electrolyte Solution

In an argon-filled glovebox ($H_2O<0.1$ ppm, and $O_2<0.1$ ppm), ethylene carbonate (EC)/propylene carbonate (PC)/diethyl carbonate (DEC)/propyl propionate (PP) were evenly mixed at a mass ratio of 10:20:40:30, and the fully dried lithium hexafluorophosphate ($LiPF_6$) was dissolved at a final concentration of 1 mol/L, and fluoroethylene carbonate with C wt % of the total mass of the electrolyte solution was added after dissolution. The specific addition amount is shown in Table 1. Subsequently, 2 wt % of 1,3-propanesulfonolactone, 2 wt % of 1,3,6-hexanetrionitrile, and 1 wt % of the first additive were added, where $R_1$ to $R_5$ in the first additive were all methyl. The resulting mixture was uniformly stirred, and a required electrolyte solution was obtained after passing the water and free acid tests. It should be noted that the percentages added are based on the total mass of the final electrolyte set.

(4). Preparation of a Battery

Figure 3:
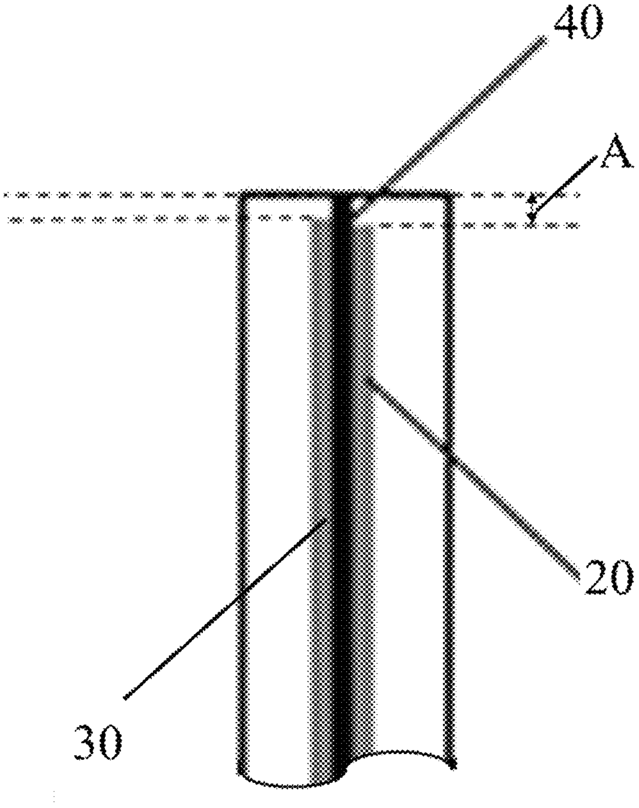
FIG. 3 shows a distance A between an edge of the separator and an edge of the electrode plate.

The positive electrode plate in step (1), the negative electrode plate in step (2), and a separator were stacked in an order of the positive electrode plate, the separator, and the negative electrode plate, and then were wound to obtain a battery cell. Batteries with different redundant widths A of the separator (the redundant width A of the separator is shown in FIG. 3) were obtained based on different widths of the positive electrode plate and the separator, as shown in Table 1. Battery cells of different sizes were placed in an outer packaging aluminum foil, and housings of different heights were wrapped around the battery cells, and a cavity height of each housing was B, as shown in Table 1. The electrolyte solution in step (3) was injected into the outer packaging to ensure a slight excess of electrolyte in the battery, and the battery was obtained through processes of vacuum packaging, standing, formation, jelly roll forming, sorting, and the like. A charging and discharging range of the battery in the present disclosure ranges from 3.0 to 4.5 V. A battery cycling performance test and a battery self-discharge k value test were carried out on the batteries obtained in Examples and Comparative Examples. For the test results, refer to Table 2.

Battery Performance Test (1) 25° C. Cycling Performance Test

Each battery in Table 1 was charged and discharged cyclically within a charge/discharge cut-off voltage range at a rate of 1 C at 25° C. A discharge capacity of the first cycle was recorded as x1 mAh, and a discharge capacity of the $N^{th}$ cycle was recorded as y1 mAh. The capacity of the $N^{th}$ cycle was divided by the capacity of the first cycle to obtain a cycling capacity retention rate $R_1$=y1/x1 of the $N^{th}$ cycle. The number of cycles when the cycling capacity retention rate RI was 80% was recorded.

(2) Battery Self-Discharge k Value Test

Each battery in Table 1 was charged to a cut-off voltage at a rate of 1 C at 25° C. (a cut-off current was 0.025C), the battery was left standing for 5 minutes, and then an open-circuit voltage OCV1 (unit: volt (V)) of the lithium-ion battery was tested. The fully charged battery cell/battery was left open-circuited for 24 hours at (25±2)° C., and a voltage OCV2 after the battery was left open-circuited was tested, and the self-discharge coefficient k value of the lithium-ion battery was calculated: k=(OCV1−OCV2)/24.

TABLE 1

Parameters of batteries in Examples and Comparative Examples

| Sequence number | Redundant width A of a separator (mm) | Height B of a cavity (mm) | Content C of FEC |
|---|---|---|---|
| Comparative Example 1 | 0.4 | 100 | 7 |
| Comparative Example 2 | 1 | 300 | 7 |
| Comparative Example 3 | 1 | 100 | 5 |
| Example 1 | 1 | 100 | 7 |
| Example 2 | 1 | 100 | 9 |
| Example 3 | 1 | 100 | 11 |
| Example 4 | 2 | 100 | 7 |
| Example 5 | 3 | 100 | 7 |
| Example 6 | 3 | 200 | 7 |
| Example 7 | 3 | 300 | 7 |
| Example 8 | 4 | 100 | 15 |
| Example 9 | 2 | 400 | 20 |
| Example 10 | 0.5 | 50 | 12 |

Example Group 11

Referring to Example 8, the difference from Example 8 is that the first additive is different, as follows.

Example 11a: $R_1$-$R_5$ are all selected from H, with the structural formula

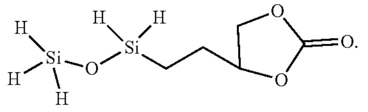 [SMILES: O=C1OCC(CC[SiH2]O[SiH3])O1]

Example 11b: $R_1$, $R_2$, and $R_4$ are all selected from H, $R_3$ and $R_5$ are both selected from —C(═O)—$C_{1-10}$ alkyl, with the structural formula

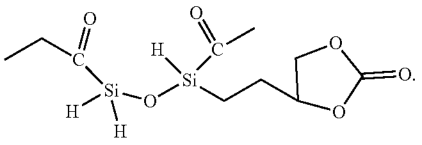 [SMILES: CCC(=O)[SiH2]O[SiH](CCC1COC(=O)O1)C(C)=O]

Example 11c: $R_1$, $R_2$, $R_4$, $R_5$ are all selected from $CH_3$, $R_3$ is selected from phenyl, and the structural formula is

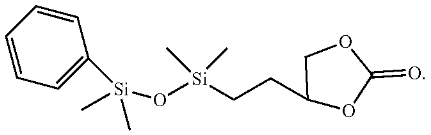 [SMILES: C[Si](C)(CCC1COC(=O)O1)O[Si](C)(C)c1ccccc1]

TABLE 2

| Performance test results of batteries in Examples and Comparative Examples | | |
|---|---|---|
| Sequence number | Number of cycles at 25° C. | Battery self-discharge k value test |
| Comparative Example 1 | 635 | 0.52 |
| Comparative Example 2 | 688 | 0.21 |
| Comparative Example 3 | 711 | 0.12 |
| Example 1 | 902 | 0.07 |
| Example 2 | 973 | 0.06 |
| Example 3 | 933 | 0.06 |
| Example 4 | 972 | 0.05 |
| Example 5 | 1013 | 0.04 |
| Example 6 | 966 | 0.05 |
| Example 7 | 909 | 0.06 |
| Example 8 | 1059 | 0.03 |
| Example 9 | 876 | 0.07 |
| Example 10 | 882 | 0.08 |
| Example 11a | 998 | 0.04 |
| Example 11b | 1042 | 0.03 |
| Example 11c | 987 | 0.03 |

It can be seen from Table 2 that for Comparative Example 1 and Comparative Example 2 in which the ratio of the height B of the cavity where the battery cell is located to the redundant width A of the separator (X represents B/A) is not in the range of $25 \leq X \leq 200$, the self-discharge k values (mV/h) of the batteries are 0.52 and 0.21, respectively, which is significantly greater than the normal value of 0.08 and is also significantly greater than the corresponding k value of 0.07 in Example 1 under the same electrolyte solution condition. In addition, the 25° C. cycling performance in Comparative Example 1 and Comparative Example 2 is also significantly worse than that in Example 1. It can be seen that when the ratio of the height B of the cavity to the redundant width A of the separator X exceeds the range of 25 to 200, lithium precipitation performance and self-discharge performance of the battery significantly deteriorate.

It can be seen from Comparative Example 3 in Table 2 that when the ratio X of the height B of the cavity to the redundant width A of the separator is in the range of 25 to 200, if the relational expression $C \geq X/20+1$ between the content C of FEC in the electrolyte solution and the ratio X is not satisfied, the self-discharge k value of the battery (mV/h) is significantly greater than the normal value of 0.08, and the 25° C. cycling performance is significantly worse than that in Example 1 under the same condition. The content of FEC in the electrolyte solution may be appropriately adjusted based on a value of X, so that the electrolyte solution can satisfy film forming requirements of the corresponding battery, to ensure that the self-discharge k value of the battery is in an appropriate range and the battery has a long cycle life.

It can be seen from Examples 1 to 3 that when the ratio X of the height B of the cavity to the redundant width A of the separator is in the specified range and fixed at 100, if the content of FEC is continuously increased, the 25° C. cycling performance of the battery is first improved and then deteriorates slightly, while the K value is slightly improved. The results show that when the ratio X is in an appropriate range, the film forming performance of the electrolyte solution can be improved by increasing FEC, and film forming components are more sufficient when the content of FEC is higher. However, when the film forming components of the electrolyte solution are sufficient, a further increase in the film forming components may lead to dilution of a lithium salt and increase viscosity of the electrolyte solution, and the cycling performance of the battery will begin to deteriorate, and a further increase in the content of FEC will have less impact on a self-discharge degree of the battery.

It can be seen from Example 1, Example 4, and Example 5 that when components of the electrolyte solution and the height of the cavity remain unchanged, if the relational expression of $C \geq B/20A+1$ is satisfied, the 25° C. cycling performance and the k value are improved. However, as the redundant width A of the separator in the battery increases, the 25° C. cycling performance of the battery is constantly improved, and the self-discharge k value (mV/h) constantly decreases. This indicates that when other conditions remain unchanged, an increased redundant width of the separator can improve short-circuit prevention performance of the battery and ensure that the electrolyte solution is more sufficient to improve normal temperature cycling performance, but an overall energy density of the battery will decrease.

It can be seen from Examples 5 to 7 that when the components of the electrolyte solution and the redundant width of the separator remain unchanged, if the relational expression of $C \geq B/20A+1$ is satisfied, the 25° C. cycling performance and the k value are improved. However, as the height B of the cavity in the battery increases, the 25° C. cycling performance of the battery constantly deteriorates, and the self-discharge k value (mV/h) constantly decreases. This indicates that when other conditions remain unchanged, a decreased height of the cavity in the battery can reduce short-circuit prevention performance and reduce the electrolyte solution, thereby reducing the normal temperature cycling performance, but the overall energy density of the battery will increase.

In conclusion, in the battery of the present disclosure, the content of FEC in the electrolyte solution is appropriately adjusted based on the distance between an edge of the separator and an edge of an electrode plate that are on a same side in the winding axis direction of the battery cell and the height of the cavity in the housing, so that the relational expression of $C \geq B/20A+1$ is satisfied, so as to prevent a significant increase in side reactions due to insufficient electrolyte solution cycling in the late stage, thereby improving the K value of the battery and the cycling performance of the battery.

The embodiments of the present disclosure are described above with reference to the accompanying drawings, but the present disclosure is not limited to the embodiments. The embodiments are only illustrative rather than restrictive. Inspired by the present disclosure, a person of ordinary skill in the art can still derive a plurality of variations without departing from the essence of the present disclosure and the protection scope of the claims. All these variations shall fall within the protection scope of the present disclosure.

What is claimed is:

1. A battery, comprising:

a housing, wherein the housing has a cavity;

a battery cell, wherein the battery cell is arranged in the cavity, the battery cell comprises a positive electrode plate, a negative electrode plate, and a separator arranged between the positive electrode plate and the negative electrode plate, and the positive electrode plate, the negative electrode plate, and the separator are wound to form the battery cell; wherein in a winding axis direction of the battery cell, a width of the separator is greater than a width of the positive electrode plate and a width of the negative electrode plate, and a height of the cavity is greater than or equal to the width of the separator; and an electrolyte solution, wherein the electrolyte solution is filled in the battery cell, and the electrolyte solution comprises fluoroethylene carbonate, wherein the cavity, the separator, and the electrolyte solution satisfy following relationship:

$$C \geq B/20A + 1,$$

wherein a content of fluoroethylene carbonate in the electrolyte solution is C %, and a value of C is less than or equal to 20 and greater than or equal to 2.25;

A represents a distance between an edge of the separator and an edge of a positive electrode plate that are on a same side in the winding axis direction of the battery cell, and B represents a height of the cavity in the winding axis direction of the battery cell, and B ranges from 50 mm to 400 mm;

a ratio of the height B of the cavity in the winding axis direction of the battery cell to the distance A between the edge of the separator and the edge of the positive electrode plate that are on the same side in the winding axis direction of the battery cell ranges from 25 to 200, wherein the electrolyte solution comprises a second additive, wherein the second additive comprises 1,3-propane sultone and 1,3,6-hexanetricarbonitrile, a content of the second additive accounts for 0.5 wt % to 15 wt % of the mass of the electrolyte solution, wherein an upper edge of the separator abuts against an upper inner side wall of the cavity, and a lower edge of the separator abuts against a lower inner side wall of the cavity.

2. The battery according to claim 1, wherein a value of C is greater than or equal to 7.

3. The battery according to claim 2, wherein the value of C is equal to 15.

4. The battery according to claim 1, wherein the distance between the edge of the separator and the edge of the electrode plate that are on the same side in the winding axis direction of the battery cell ranges from 0.5 mm to 4 mm.

5. The battery according to claim 1, wherein the electrolyte solution further comprises:

at least one of an electrolyte salt or a solvent.

6. The battery according to claim 5, wherein the electrolyte salt comprises at least one of lithium hexafluorophosphate, lithium difluorophosphate, lithium difluoro(oxalato)borate, lithium bis(fluorosulfonyl)imide, lithium bis(trifluoromethanesulphonyl)imide, lithium difluorobis(oxalato)phosphate, lithium tetrafluoroborate, lithium bis(oxalate)borate, lithium hexafluoroantimonate, lithium hexafluoroarsenate, lithium bis(trifluoromethylsulfonyl)imide, lithium bis(pentafluoroethanylsulfonyl)imide, tris(trifluoromethylsulfonyl)methyllithium, or lithium bis(trifluoromethylsulfonyl)imide.

7. The battery according to claim 5, wherein the solvent is selected from at least one of carbonate and/or carboxylate, and the carbonate is selected from at least one of the following fluorinated or unsubstituted solvents: ethylene carbonate, propylene carbonate, dimethyl carbonate, diethyl carbonate, and ethyl methyl carbonate; and the carboxylate is selected from at least one of the following fluorinated or unsubstituted solvents: propyl acetate, n-butyl acetate, isobutyl acetate, n-amyl acetate, isoamyl acetate, propyl propionate, ethyl propionate, methyl butyrate, and ethyl n-butyrate.

8. The battery according to claim 1, wherein the electrolyte solution further comprises:

a first additive, wherein a structural formula of the first additive is:

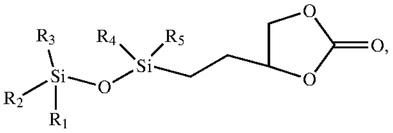

wherein $R_1$ to $R_5$ are independently selected from H, Ra, $C_{1-10}$ alkyl, or any $C_{1-10}$ alkyl substituted by at least one Ra, and each Ra is independently selected from at least one of halogen, $C_{1-10}$ alkyl, —C(═O)—$C_{1-10}$ alkyl, —C(═O)—O—C(═O)—$C_{1-10}$ alkyl, $C_{6-14}$ aryl, or 5- to 14-membered heteroaryl.

9. The battery according to claim 8, wherein $R_1$ to $R_5$ are independently selected from H, $C_{1-3}$ alkyl, —C(═O)—$C_{1-3}$ alkyl, or $C_{6-8}$ aryl.

10. The battery according to claim 9, wherein $R_1$ to $R_5$ are all selected from H, methylene, ethyl, —C(═O)—$C_2H_5$, or phenyl.

11. The battery according to claim 10, wherein at least two of $R_1$ to $R_5$ are independently selected from H or methyl.

12. The battery according to claim 11, wherein the first additive contains at least one of the compounds as shown in the following chemical formulas:

I

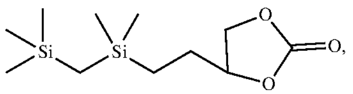

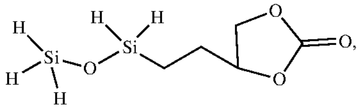

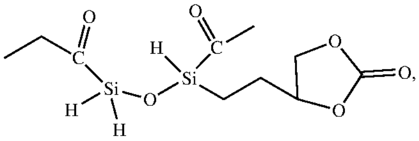

or

-continued

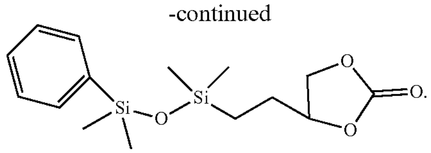

13. The battery according to claim 8, wherein a content of the first additive accounts for 0.1 wt % to 5 wt % of a mass of the electrolyte solution.

14. The battery according to claim 1, wherein the second additive further comprises at least one of fluoroethylene carbonate, 1-propene 1,3-sultone, succinonitrile, adiponitrile, glycerol trinitrile, lithium difluoro(oxalato)borate, lithium difluorophosphate, and lithium bisoxalatodifluorophosphate.

15. The battery according to claim 1, wherein the battery is a lithium cobalt oxide battery, a ternary battery, or a lithium iron phosphate battery.

* * * * *